United States Patent [19]

Pober

[11] 4,166,159
[45] Aug. 28, 1979

[54] PROCESS FOR FORMING FAST SODIUM-ION TRANSPORT COMPOSITIONS

[75] Inventor: Richard L. Pober, Waban, Mass.

[73] Assignee: Massachusetts Institute of Technology, Cambridge, Mass.

[21] Appl. No.: 930,302

[22] Filed: Aug. 2, 1978

[51] Int. Cl.$^2$ .................. H01M 6/18; C01B 33/32
[52] U.S. Cl. ...................... 429/193; 423/306; 423/332
[58] Field of Search ............... 423/332, 306; 429/191, 429/193, 104

[56] References Cited

U.S. PATENT DOCUMENTS

| | | | |
|---|---|---|---|
| 4,009,092 | 2/1977 | Taylor | 429/193 |
| 4,042,482 | 8/1977 | Shannon et al. | 429/193 |
| 4,049,891 | 9/1977 | Hong et al. | 429/193 |

*Primary Examiner*—Donald L. Walton
*Attorney, Agent, or Firm*—Arthur A. Smith, Jr.; Paul J. Cook

[57] ABSTRACT

Fast sodium-ion transport compositions of the formula:

$$Na_{1+x}Zr_2Si_xP_{3-x}O_{12}$$

wherein x is greater than 0 and less than 3 are formed from ZrSiO$_4$ and anhydrous trisodium phosphate, disodium phosphate, mixtures of trisodium phosphate and disodium phosphate alone or with sodium phosphate.

4 Claims, No Drawings

PROCESS FOR FORMING FAST SODIUM-ION TRANSPORT COMPOSITIONS

BACKGROUND OF THE INVENTION

This invention relates to a process for making fast sodium-ion transport compositions.

As disclosed in U.S. Pat. No. 4,049,891, Hong et al., compounds of the formula:

$$Na_nX_2(ZO_4)_3$$

wherein n is a number greater than 1, X is an octahedrally coordinated cation or mixture thereof and Z is a tetrahedrally coordinated cation or mixture thereof have excellent properties which permit their use as fast sodium ion transport compositions. Prior to that invention, $\beta$ and $\beta''$-alumina were the solids with fastest sodium-ion transport; they stimulated interest in their use as solid electroytes for cells and thermoelectric generators as disclosed in U.S. Pat. No. 3,475,223. The best $\beta''$-alumina compositions have resistivities for sodium-ion transport at 300° C. of about 4 ohm-cm and an activation energy for the mobility of about 0.16 eV. Unfortunately, the volatility of soda together with the refractory nature of aluminum oxide has rendered production of ceramic membranes therefrom expensive. Furthermore, $\beta$- and $\beta''$-alumina are layer compounds in which the sodium ions are constrained to move in only two dimensions so that the confinement of sodium ions to widely separated layers sharply reduces the fraction of the membrane volume that transports sodium ions. Furthermore, the structure of $\beta$- and $\beta''$-alumina promotes anisotropic thermal expansion so so that the life of thermally cycled membranes made therefrom is reduced significantly.

The Hong et al compositions are characterized by a three-dimensional rigid structure of open networks formed from corner-shared oxygen tetrahedra or tetrahedra and octahedra through which the Na+ ion can move in three dimensions. In addition, the minimum cross-sectional diameter of the interstitial space is about twice the sum of the atomic diameter of the anion and the sodium ion. Thus, the minimum cross-section diameter is about 4.8 A for sodium ions and usually about 4.8 to 5.4 A for sodium. The compositions are also characterized by having the lattice sites of the network interstitial space only partially occupied with sodium ions to permit ion transport within the crystal structure. If these sites were fully occupied by the sodium ion, there would be little or no sodium transfer within the crystal structure. In addition, if the sites available to the sodium ions are crystallographically inequivalent, the difference between the respective site-occupancy energies should be small and/or the number of mobile ions should be large enough to insure some occupancy of all types of sites available to them in order to minimize the activation energy of the mobility.

The compositions are useful as solid electrolytes in cells utilizing liquid sodium metal as a negative electrode wherein the composition comprises a membrane between the liquid metal and a positive electrode, such as liquid polysulfide impregnated with an electron conductor like carbon felt as in NaS battery. The compositions also can be utilized as a solid electrolyte in a thermoelectric generator employing a differential pressure of sodium ions maintained across the membrane formed of the composition. In addition, a membrane of these compositions can be utilized to extract selectively sodium ions from sodium salts such as NaCl.

As disclosed by Hong et al, the reactants utilized comprise the oxides and/or salts of the cations that are reducible to the oxides under the reaction conditions of temperature and pressure employed and the compositions are formed in a conventional manner including a procedure involving two heating steps. The starting materials in particulate solid form are heated to a sintering temperature for a period of time to assure conversion to a product wherein the anions and the cations are bonded to oxygen atoms to form the tetrahedral or tetrahedral-octahedral crystalline structure. For example, the solid mixture is heated stepwise to decompose the least thermally stable reactant such as $NH_4H_2PO_4$ at about 170° C. and then heating at an elevated temperature of about 900° C. to decompose the $Na_2CO_3$ and then at a highly elevated temperature of about 1200° C. to transform the reactants, which form the desired crystalline structure. The period of heating depends upon the amount of reactants with a representative time period being between about 4 hours and 24 hours. When forming a ceramic structure from the compositions of this invention, a flux material can be added to the reactants and reacted therewith by any means well known in the art.

This method for forming these compositions described above is time consuming and expensive. In addition, for the preferred compositions of the general formula:

$$Na_{1+x}Zr_2Si_xP_{3-x}O_{12}$$

wherein x is greater than 0 and less than 3, the procedure utilized and required at least three starting materials, e.g., $Na_2CO_3$, $ZrO_2$, $SiO_2$ and $NH_4H_2PO_4$ and two heating steps and an overall time of about 12 hours in order to form the desired product. Prior attempts to form this product from the two inexpensive materials, zircon flour ($ZrSiO_4$, ground fine) and hydrated trisodium phosphate ($Na_3PO_4$) failed. Upon heating of these two materials, the trisodium phosphate appears to decompose rather than to react with the zircon flour. In any event, the desired product was not obtained.

It would be highly desirable to provide a process for making these fast sodium-ion exchange compositions from inexpensive starting materials and by a one-step process.

SUMMARY OF THE INVENTION

This invention is based upon the discovery that fast sodium-ion transport compositions of the formula:

$$Na_{1+x}Zr_2Si_xP_{3-x}O_{12}$$

can be prepared from zirconium silicate ($ZrSiO_4$) and anhydrous disodium phosphate, trisodium phosphate, mixtures thereof or mixtures thereof with sodium phosphate. It has been found that when the phosphate reactant is anhydrous, reaction proceeds to the desired product rather than undesirable reactant decomposition as occurs with hydrated trisodium phosphate. Furthermore, the reaction can be conducted in one heating step for relatively short times. Thus, the process provides substantial economic benefits both from the standpoint of cost of reactants and from the standpoint of heating costs.

DESCRIPTION OF SPECIFIC EMBODIMENTS

The zirconium silicate reactant is a finely ground composition having an average particle size less than about 50 microns and preferably less than about 5 microns in order that the reaction with the phosphate reactant can proceed to substantial completion relatively quickly. The zirconium silicate can be comminuted prior to mixing with the phosphate reactant or can be ground and mixed simultaneously with the phosphate reactant such as by ball milling.

It is essential that the phosphate reactant composition be anhydrous in order that decomposition of the reactants does not occur and in order to obtain the desired product. By the term "anhydrous" as used herein what is meant is $Na_3PO_4$ with no water of crystallization. It is preferred that the phosphate composition be such as to form a product having the composition set forth above wherein x is between about 1.5 and 2.5 and more preferably 2.0 since these compositions have the greatest sodium-ion conductivity. The value of x can be controlled by utilizing appropriate ratios of trisodium phosphate, either alone or admixed with disodium phosphate and/or monosodium phosphate. In any event, the phosphate reactant must be anhydrous.

Reaction is conducted at a temperature which assures substantially complete reaction in a relatively short time. Generally suitable reaction temperatures are in the range of between about 1050° C. and 1250° C., preferably between about 1100° C. and 1150° C. Reaction is generally conducted in a crucible formed of an inert material such as magnesia, zirconia, or the like. Substantially complete reaction is achieved usually in less than about 10 hours. The reaction is normally done in air, although special atmospheres may be desirable for certain compositions and/or properties. When forming a ceramic structure from the compositions obtained by the present invention, a flux material can be added to the reactants and reacted therewith by any means well known in the art.

The following examples illustrate the present invention and are not intended to limit the same.

EXAMPLE I

This example illustrates that when using hydrated trisodium phosphate, decomposition of the reactants occurs before the desired product is formed.

Zircon is mixed with hydrated trisodium phosphate (TSP-technical) in the ratio 2 moles zircon: 1 mole TSP and the mixture is milled to produce an intimate mixture of fine particles. The mixture is heated to 1150° C. and reacted for 8 hours. X-ray analysis of this material does not show the presence of a compound having the formula $$Na_{1+x}Zr_2Si_xP_{3-x}O_{12}$$

wherein x is defined above.

EXAMPLE II

This example illustrates that when anhydrous trisodium phosphate is used as a reactant, the desired product is obtained without decomposition of the reactants.

Zircon is mixed with anhydrous trisodium phosphate (TSP) in the ratio 2 moles zircon: 1 mole TSP, and the mixture is milled to produce an intimate mixture of fine particles. The mixture is heated to 1150° C. and reacted for 8 hours. X-ray analysis of this material shows it to be a compound of the general formula:

$$Na_{1+x}Zr_2Si_xP_{3-x}O_{12}$$

What is claimed is:

1. The process of forming a fast sodium-ion transport composition of the formula:

$$Na_{1+x}Zr_2Si_xP_{3-x}O_{12}$$

where x is a number greater than 0 and less than 3 which comprises reacting zirconium silicate with an anhydrous phosphate reactant selected from the group consisting of trisodium phosphate, a mixture of trisodium phosphate and disodium phosphate and mixtures thereof with monosodium phosphate.

2. The process of claim 1 wherein the anhydrous phosphate reactant is trisodium phosphate.

3. The process of claim 1 wherein the anhydrous phosphate is a mixture of trisodium phosphate and disodium phosphate.

4. The process of claim 1 wherein the reaction temperature is between about 1100° C. and 1150° C.

* * * * *